Jan. 5, 1932.  M. CHARLES  1,839,298
HYDRAULIC BRAKING SYSTEM
Filed Sept. 5, 1929
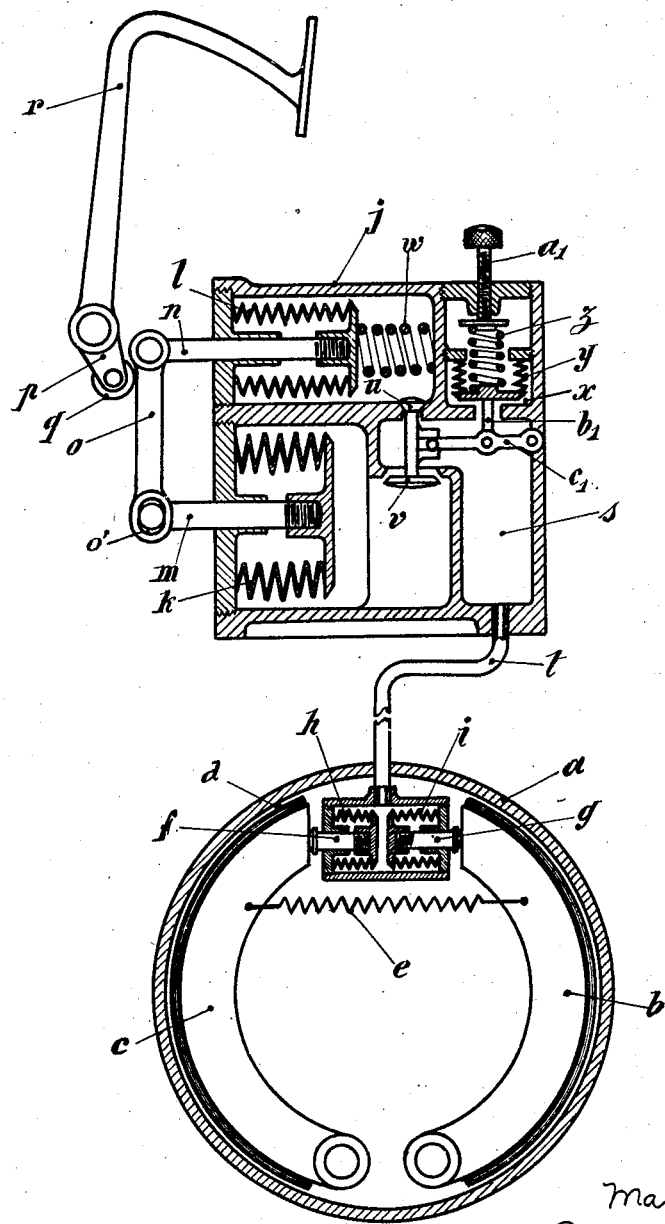
Inventor:-
Maurice Charles,
By Mauro & Lewis
Attorneys Patented Jan. 5, 1932

1,839,298

UNITED STATES PATENT OFFICE

MAURICE CHARLES, OF COURBEVOIE, FRANCE

HYDRAULIC BRAKING SYSTEM

Application filed September 5, 1929, Serial No. 390,583, and in France May 28, 1929.

The present invention has for an object a hydraulic braking system adapted to automatically take up for play in the shoes of the brake drums and the wear in the brake linings and to compensate for the variations in volume of liquid due to the expansion and contraction thereof.

In my prior U. S. patent applications Serial No. 35,740, filed June 8, 1925, and Serial No. 288,200, filed June 25, 1928 (Patent #1,776,488, granted Sept. 23, 1930), I disclosed a hydraulic braking system in which, in principle, a generating bellows was expanded under the effect of a brake pedal which drove the liquid into receiving cylinders whose bellows, thus flattened spread the jaws of the brakes, compensation being assured by a regulating cylinder in which the bellows was expanded or compressed by an arrangement such as a screw actuated by a milled knob situated within reach of the driver and modified the initial position of the shoes in the brake drums by driving out an auxiliary amount of liquid into the pipe lines.

In my present invention, the linings are continually separated from the drums at a distance equal to the play given thereto during assembling increased by the thickness to which they have become worn during operation of the brakes.

Said play which can attain a considerable value when the linings are totally worn, is therefore taken up automatically according to the present invention during a stroke of the brake without necessitating any attention of the driver.

For this purpose, the generator comprises, for each circuit, that is, the front and rear brakes, two pistons of different section respectively connected to the pedal, the bellows of smaller section through a motion reducing mechanism calculated to obtain the braking force, the bellows of larger section through a motion reducing mechanism having less effect. The latter bellows displaces a large quantity of liquid and has for a purpose to take up for play with a short stroke of the pedal, no matter how considerable it may be, in the linings of the brake drums, and is thrown automatically out of the circuit as soon as the linings are in contact with the drum. From this moment on only the bellows of smaller section comes into play to assure the braking force calculated.

The following description when taken in connection wth the accompanying drawing, given by way of example, will enable those skilled in the art to understand how my invention is carried into effect.

In the drawing the single figure represents a section taken through my apparatus connected to a brake.

Referring to the drawing more in detail, in a brake drum $a$ are two shoes $b$ and $c$ having a certain amount of play $d$ with respect to said drum, which play is equal to that given initially increased by the wear of the linings.

The two shoes $b$ and $c$ are maintained away from the drum $a$ by a spring $e$ which causes them to bear against rods $f$ and $g$ of two receiving bellows $h$ and $i$ similar to those more fully described in my prior U. S. patent applications Serial No. 35,740, filed June 8, 1925, and 288,200, filed June 25, 1928.

For the purpose of taking up for the play $d$, without any regulating system and without any appreciable loss in pedal stroke, the generator $j$ is provided with two bellows $k$ and $l$ in two separate cylinders. The rods $m$ and $n$ of the two said bellows are interconnected by a link $o$ to the opposite extremities of which they are pivoted, the outer end of rod $m$ being slidably mounted in an eye $o'$ of link $o$. The link $o$ is actuated by a lever $p$ carrying a roller $q$ for example, the lever $p$ being integral with the brake pedal $r$.

The driving of the link $o$ by the roller $q$ of lever $p$, takes place at a point situated at unequal distances from the rods $m$ and $n$ and the distance to the latter being the smaller, the ratio of the two distances of the said point to the rods giving rod $n$ a force corresponding to the weight of the vehicle to be braked.

Each of the two cylinders is adapted to communicate with a chamber $s$ from which takes place the departure of the liquid toward the receiving cylinders through a pipe line $t$ by means of two check valves $u$ and $v$ rigidly connected together, and the bellows $l$ is maintained normally in a position of rest by means of a spring $w$.

In constant communication with the chamber $s$ is an auxiliary cylinder $x$ containing a bellows $y$ upon which the pressure of the liquid pushed back acts against the action of a spring $z$, whose tension is adapted to be regulated by means of a screw $a_1$ having a milled head.

Said bellows $y$ carries a rod $b_1$ adapted to act on a lever $c_1$ controlling the simultaneous displacement of the two check valves $u$ and $v$.

Under these conditions, the whole being supposed to be full of liquid and supposing the system to be in the position of rest, the shoes $b$ and $c$ are separated from the drum $a$ by a distance equal to the play $d$, which may be made considerable, and no pressure exists in the pipelines.

The spring $z$ expands the bellows $y$ and the rod $b_1$ thereof bears on the lever $c_1$.

The check valve $u$ is therefore pressed on its seat and the check valve $v$ establishes communication between the cylinder of bellows $k$, chamber $s$, pipe line $t$ and the receiving cylinders.

If at this moment, the pedal $r$ is pressed upon, the roller $q$ of lever $p$ bears on the link $o$ which thus tends to push in the rods $m$ and $n$ of the bellows $k$ and $l$. The bellows $l$ not being able to be expanded by reason of the incompressibility of the liquid contained in its cylinder, the movement is transferred to the rod $m$ of the bellows $k$ which, due to the very small motion reduction provided for between said rod and the pedal, receives an amplified movement.

Since the bellows $k$ has a larger section than the section of the receiving bellows $h$ and $i$, it will be readily understood, that however considerable the play $d$ of the shoes in their drums may be, it will be rapidly compensated for, and all with a very small stroke of the pedal $r$.

On the other hand, at the instant when the shoes come in contact with the drums, the force to overcome being only that of the tension of spring $e$, the value of the pressure will be very low and insufficient to collapse bellows $y$.

At the moment when the contact of the linings with the drum is established, the brake pedal continues its movement and the pressure rises in the pipe line until it attains the value calculated to collapse the bellows $y$ against the action of spring $z$.

At this instant, due to the large section of the check $v$, said check closes abruptly and the check $u$ opens simultaneously.

From this moment on the bellows $l$ assures braking under the same conditions as it would operate with normal motion reducing mechanism alone.

If at this instant the pedal is released, the pressure in the pipe line decreases and the bellows $l$ which is in communication therewith through the check valve $u$ returns to a position of rest under the action of spring $w$. The pressure falls beneath that required to collapse bellows $y$ against the spring $z$ and the check valve $u$ closes at this instant at the same time that the check valve $v$ opens. The bellows $k$ receives the excess of liquid in the pipe line and the pressure again becomes zero.

In the position shown in the drawing, it has been assumed that the filling has been effected at a temperature equal to the maximum ambient temperature to which the chassis and the brakes is subjected.

All variation in volume of liquid becomes transformed from this fact into a contraction and the effect of said contraction only becomes effective on the bellows $k$, alone in communication with the pipe line $t$, and by reason of the considerable section of said bellows, the position of the rod $m$ will vary relatively little.

Since the control of said rod takes place with very little motion reduction, it will be obvious that a small stroke of the pedal will be sufficient to take up for the effect of all expansion even when considerable.

Having described my invention what I claim as new and desire to secure by Letters Patent is:

1. In a hydraulic braking system a master operator comprising a pair of pressure generating cylinders having different diameters, a pressure generating bellows in each of said cylinders, foot operated means for displacing said bellows, an inwardly acting check valve for each of said cylinders, a rod interconnecting said check valves adapted to hold one check open when the other is closed, a chamber in communication with said check valves, a cylinder communicating with said chamber, a bellows in said last mentioned cylinder, an adjustable spring opposing the movement of said last mentioned bellows, and means connecting said last bellows to said rod whereby play in the braking system is compensated for upon a slight movement of said foot operated means and braking takes place upon further displacement of said foot operated means.

2. A master operator for an hydraulic braking system comprising two cylinders, a pressure generating bellows in each cylinder, foot operated means for acting simultaneously on both pressure generating bellows, a chamber, adjacent said cylinders, provided with a suitable outlet, two valves, one in each of said cylinders, communicating with said chamber, adjustable means, controlled by the pressure in said chamber, for simultaneously opening one of said valves and closing the other, whereby liquid is first forced from one cylinder through one of said valves into the braking system so as to compensate for play in said system, after which said valve is closed on account of the increasing pressure, and the liquid is compressed from the other cylinder through the other valve in order to produce the braking operation.

3. A master operator for an hydraulic braking system comprising two cylinders having different diameters, a pressure generating bellows in each cylinder, foot operated means for acting simultaneously on both pressure generating bellows, a chamber, adjacent said cylinders, provided with a suitable outlet, two valves, one in each of said cylinders, communicating with said chamber, the valve in the larger cylinder having a greater diameter, adjustable means, controlled by the pressure in said chamber, for simultaneously opening one of said valves and closing the other, whereby liquid is first forced from the larger cylinder through the valve therein into the braking system so as to compensate for play in said system, after which this last said valve is closed on account of the increasing pressure and the liquid is forced from the smaller cylinder into the braking system so as to perform the braking operation.

4. A master operator for an hydraulic braking system comprising two cylinders having different diameters, a pressure generating bellows in the smaller cylinder, a spring in said cylinder for opposing the movement of said bellows, a pressure generating bellows in the larger cylinder, foot operated means for acting simultaneously on both pressure generating bellows, a chamber, adjacent said cylinders, provided with a suitable outlet, two valves, one in each of said cylinders, communicating with said chamber, the valve in the larger cylinder having a greater diameter, adjustable means controlled by the pressure in said chamber, for simultaneously opening one of said valves and closing the other, whereby liquid is first forced from the larger cylinder through the valve therein into the braking system so as to compensate for play in said system, after which the last said valve is automatically closed on account of the increasing pressure in the chamber and the liquid is then forced from the smaller cylinder into the braking system so as to perform the braking operation.

In testimony whereof I have signed this specification.

MAURICE CHARLES.